United States Patent [19]

Wu

[11] Patent Number: 5,016,849

[45] Date of Patent: May 21, 1991

[54] SWIVEL MECHANISM FOR A MONITOR OF A LAPTOP COMPUTER

[75] Inventor: Sunny Wu, Kuang Hsi, Taiwan

[73] Assignee: Datatech Enterprises Co., Ltd., Taoyuan County, Taiwan

[21] Appl. No.: 437,594

[22] Filed: Nov. 17, 1989

[51] Int. Cl.⁵ .............................................. F16M 13/00
[52] U.S. Cl. ...................................... 248/183; 248/923; 248/371; 248/278
[58] Field of Search ............... 248/183, 922, 923, 371, 248/184, 278

[56] References Cited

U.S. PATENT DOCUMENTS 4,453,687  6/1984  Sweene ............................. 248/183
4,834,329  5/1989  Delapp ............................. 248/183

Primary Examiner—Alvin C. Chin-Shue
Attorney, Agent, or Firm—Morton J. Rosenberg; David I. Klein

[57] ABSTRACT

This invention relates a swivel mechanism for a monitor of a laptop computer and in particular to one utilizing four tightly fitted axles in the same direction to be its horizontal axis and a tightly fitted upright axle to be its vertical axis so as to enable the monitor to rotate with respect to the horizontal and the vertical axes when pushed by the user thereby widening the visible range and thus, increasing the working efficiency and the feasibility as well.

2 Claims, 5 Drawing Sheets

SWIVEL MECHANISM FOR A MONITOR OF A LAPTOP COMPUTER

BACKGROUND OF THE INVENTION

It is found that the development of the computer is now directed in facilitating the communication in addition to increasing the function, reducing the size as well as heightening the speed of a computer so as to transmit information more effectively. Hence, a so-called LAPTOP COMPUTER is developed to meet the need, the research of which is aimed at the convenience of use and portability thereby extending the applicable space and besides the above-mentioned trends.

It is, therefore, an object of the present invention to provide a swivel mechanism which enables the monitor of a laptop computer to rotate about a horizontal and a vertical axes.

SUMMARY OF THE INVENTION

This invention relates to a swivel mechanism for a monitor of a laptop computer.

It is the primary object of the present invention to provide a swivel mechanism which utilizes four tightly fitted axles in the same direction to be the horizontal axis of a monitor of a laptop computer and an upright axle to be the vertical axis thereof.

It is another object of the present invention to provide a swivel mechanism which may widen the visible range.

It is another object of the present invention to provide a swivel mechanism which may increase the working efficeincy.

It is another object of the present invention to provide a swivel mechanism which may further the feasibility of a laptop computer.

It is a further object of the present invention to provide a swivel mechanism which simple in construction.

Other objects and merits and a fuller understandings of the this invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
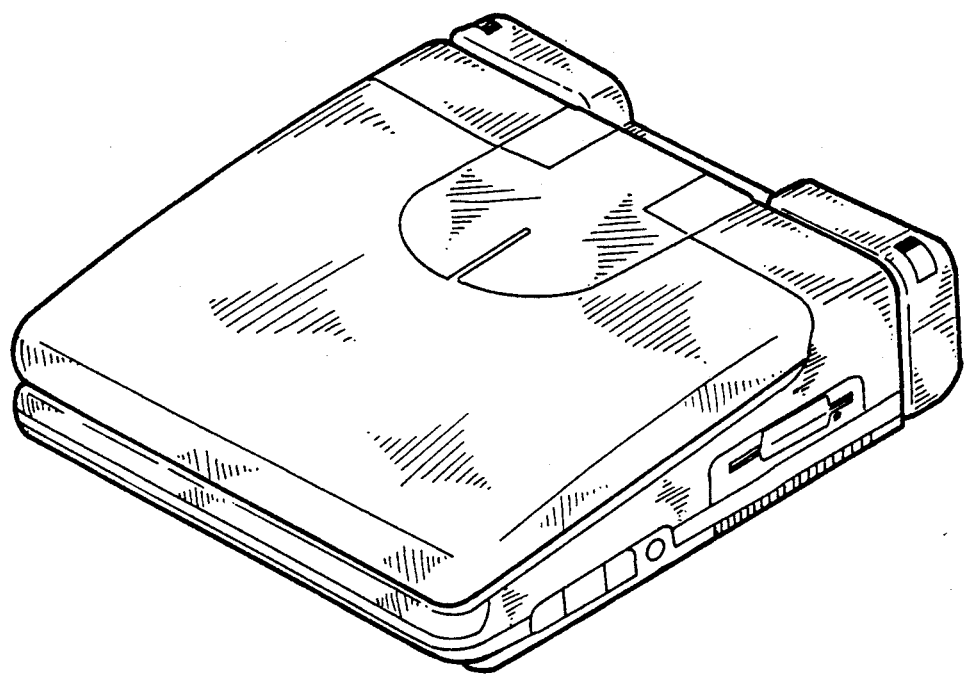
FIG. 1 is a perspective view of a swivel mechanism for a monitor of a laptop computor.
Figure 2:
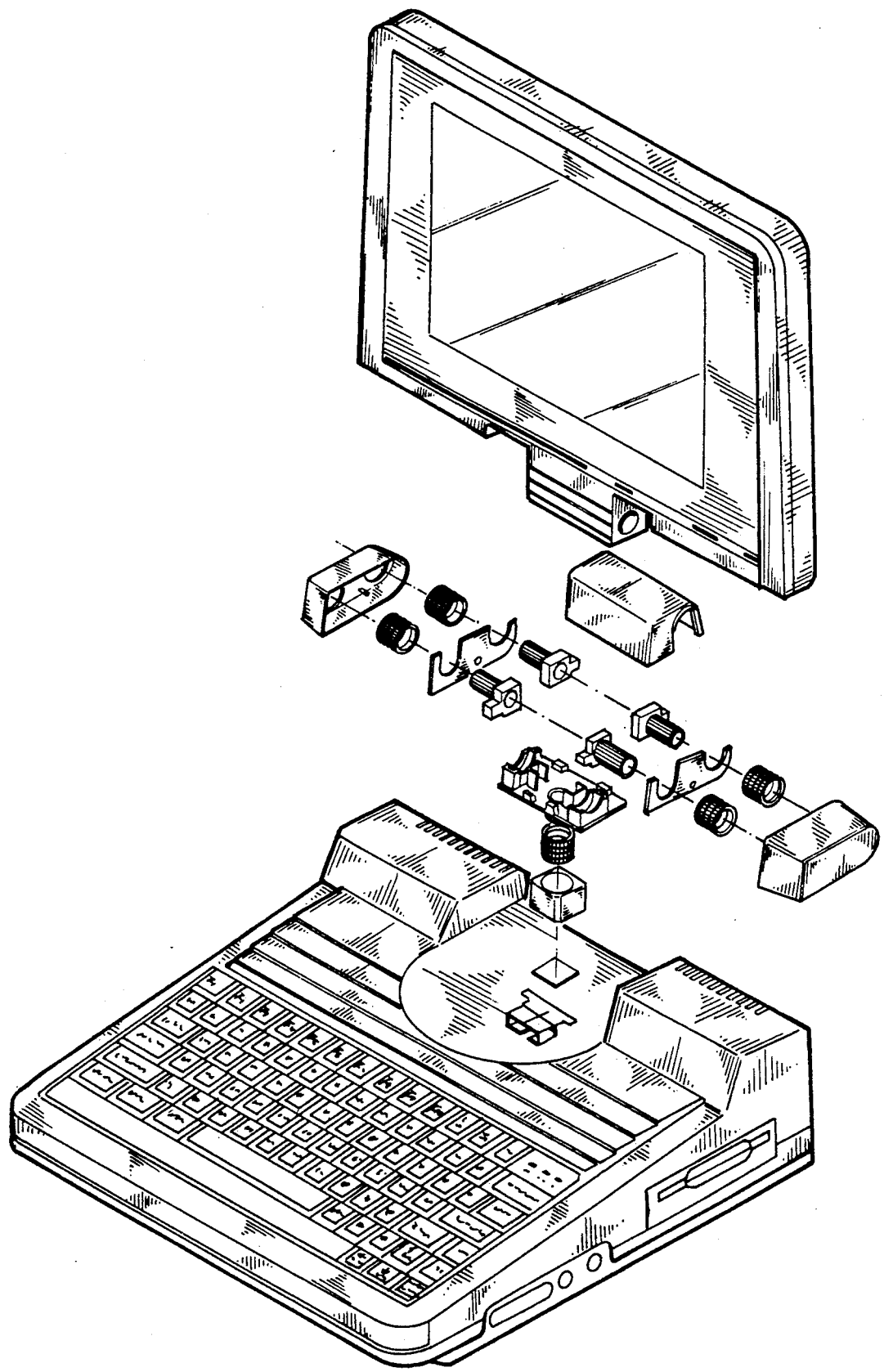
FIG. 2 is an exploded view of the swivel mechanism for a monitor of a laptop computor.
Figure 3:
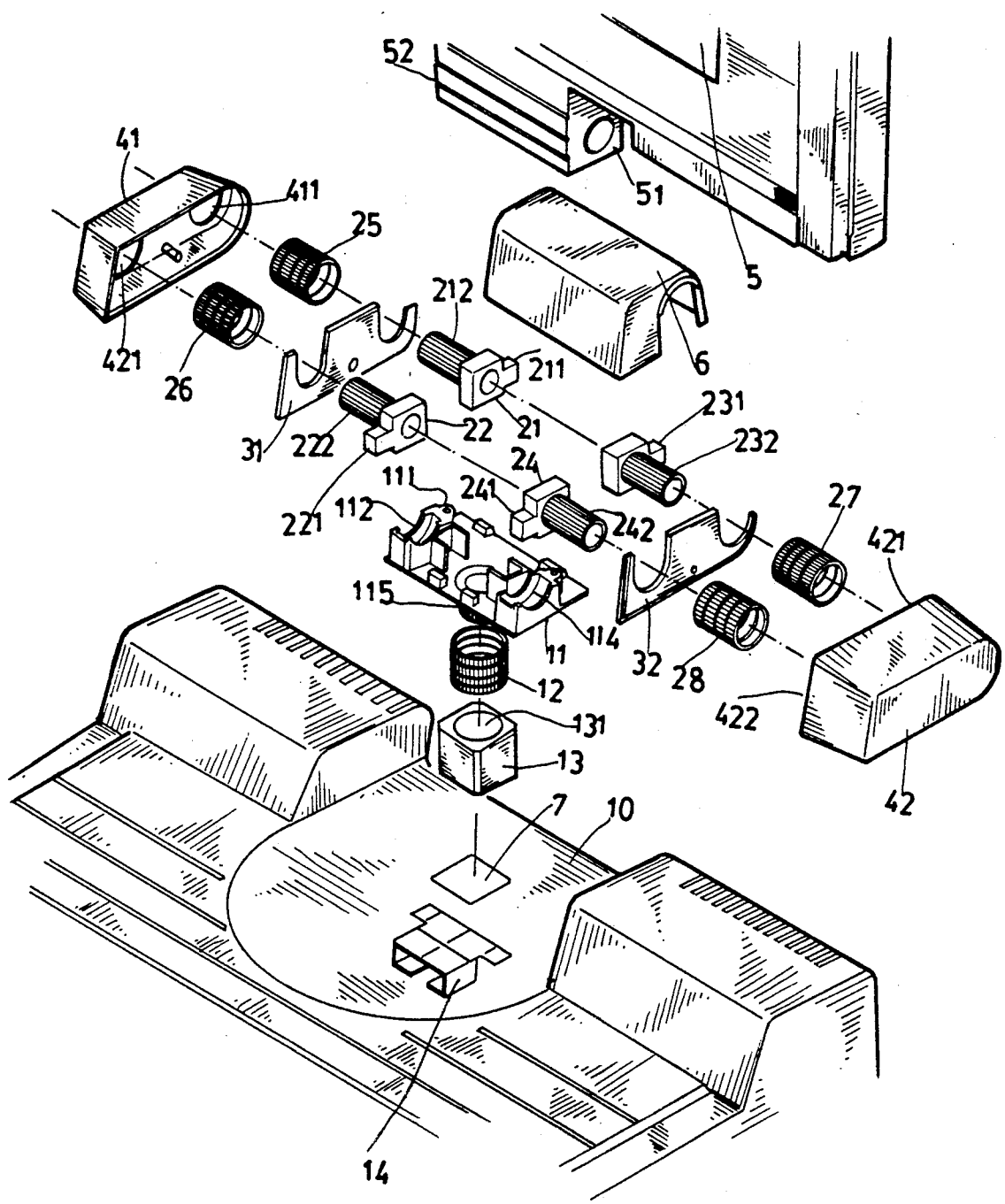
FIG. 3 is an enlarged fragmentary view of FIG. 2.
Figure 4:
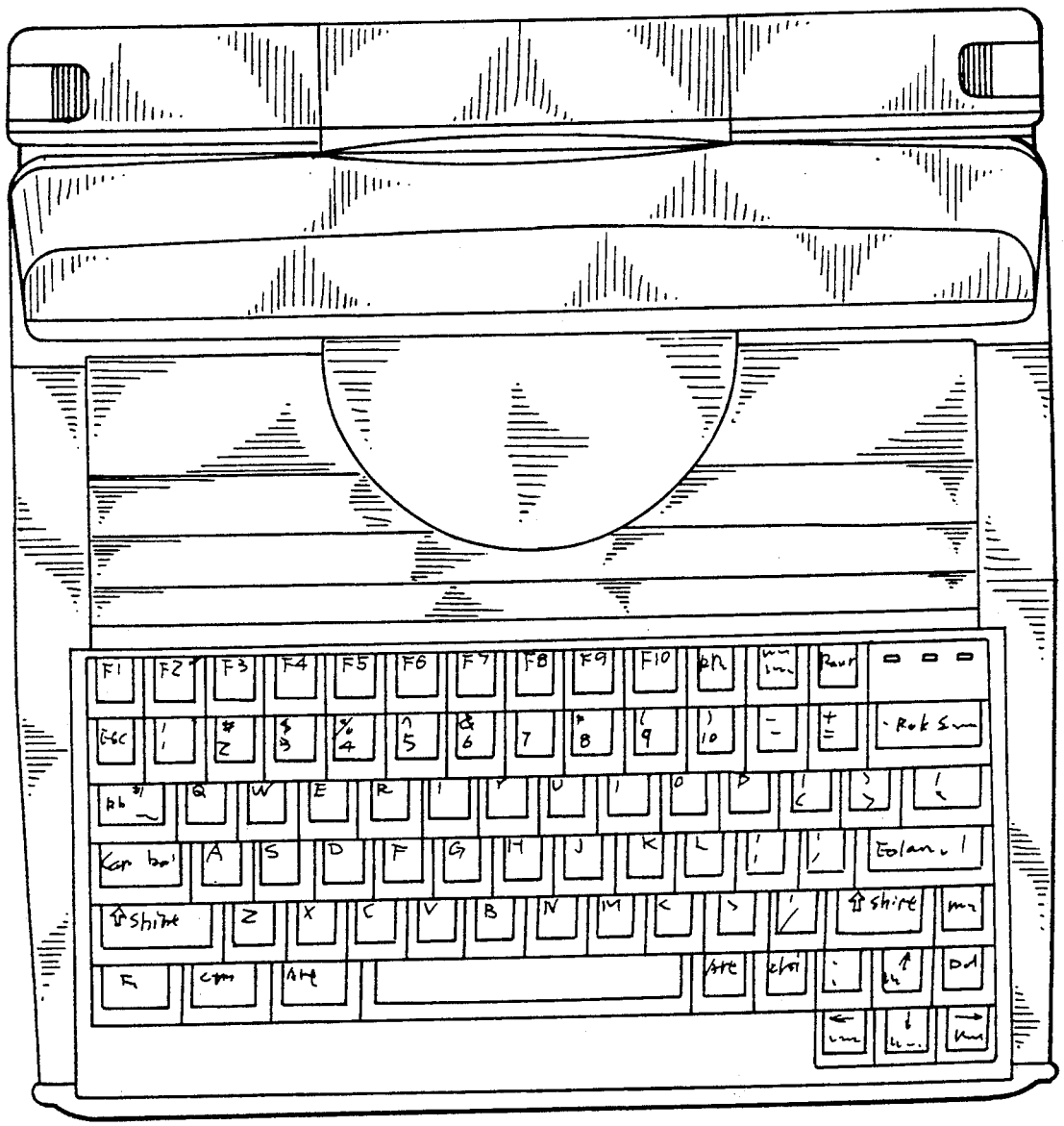
FIG. 4 is a top plan view showing the monitor being at a vertical position.
Figure 5:
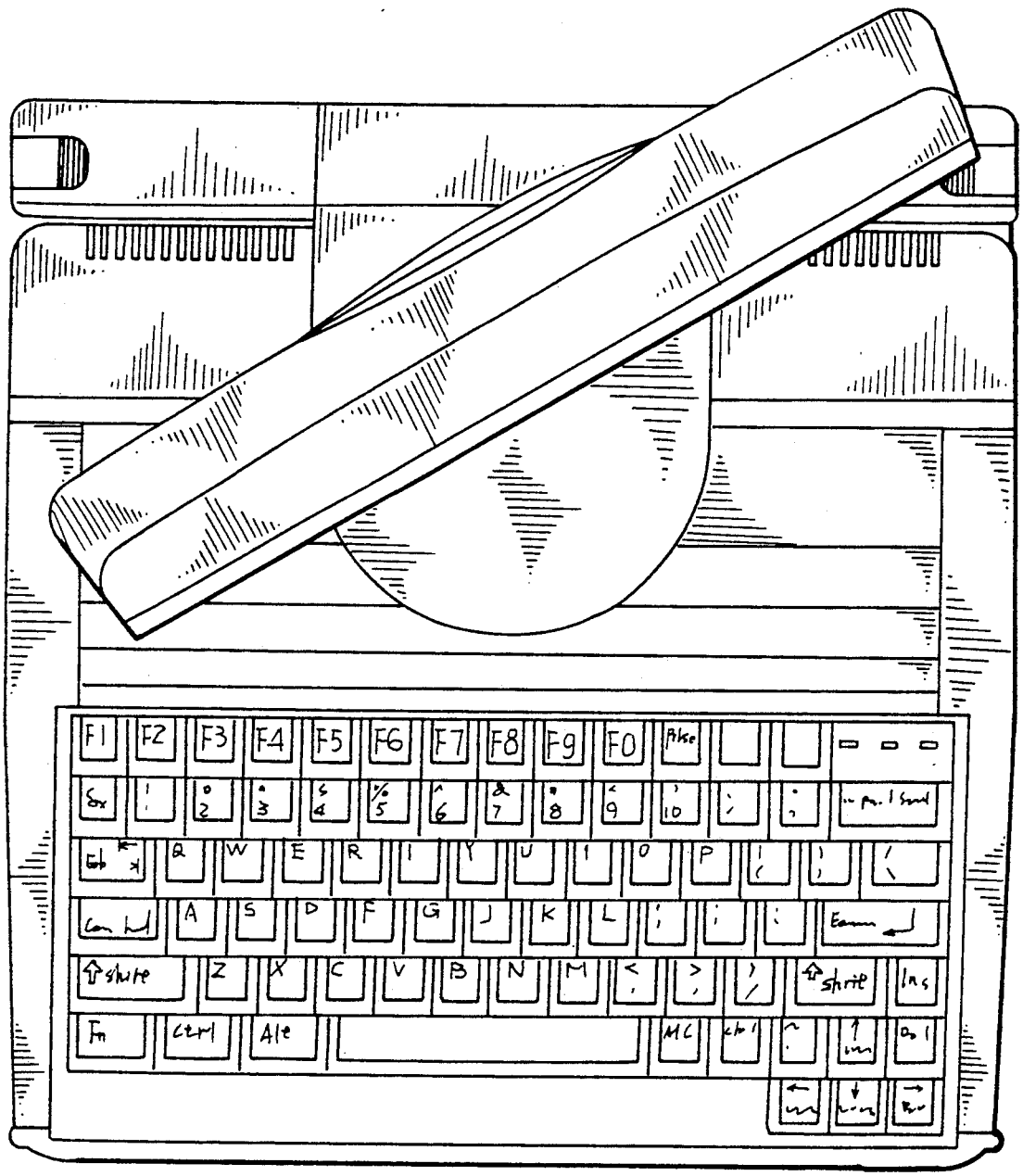
FIG. 5 is a top plan view showing the monitor being turned at an angle about the vertical axis.

With reference to the drawings and in particular to FIGS. 1, 2 and 3 thereof, the swivel mechanism for a monitor of a laptop computer according to the present invention mainly comprises a vertical axle 1 and a horizontal axle 2. The vertical axle 1 includes a fixed seat 11, a spring 12 and a positioning block 13. The positioning block 13 is a generally rectangular member disposed on a fixed frame 14 within a main body 10 through a hole 7. The positioning block 13 is formed with a vertical hole 131 in which is mounted the spring 12. The fixed frame 14 is installed by known means which has no need to be described here in detail. The bottom of the fixed seat 11 has an upright axle 115 formed with longitudinal raised lines and tightly fitted into the spring 12 thereby enabling the fixed seat 11 to rotate with respect to the fixed frame 14 and therefore, obviating the limit of vertical vision angle of 35 degrees. Since the upright axle 115 is tightly fitted into the spring 12, the monitor will not be rotated without being pushed by the user.

The horizontal axle 2 is mainly constituted by four longitudinal axles 21, 22, 23 and 24 in the same direction, four springs 25, 26, 27 and 28, two positioning plates 31 and 32, two side covers 41 and 42, and a protective cover 6. The axles 21, 22, 23 and 24 are provided with longitudinal raised lines and fixed blocks 211, 221, 231 and 241 respectively. The axle 21 extends through the fixed block 211 to connect to a threaded hole 11 of the fixed seat 11 and kept in position by a screw not shown ), with its longitudinal raised lines contacting a curved portion 112 of the fixed seat 11. The axle 23 passes through the fixed block 231 to connect to a threaded hole 113 of the fixed seat 11 and kept in position by a screw ( not shown ), also with its longitudinal raised lines contacting a curved portion 114 of the fixed seat 11. The axles 22 and 24 are engaged with the monitor 5 and the fixed blocks 221 and 241 are respectively disposed beside the inner sides 52 and 51 of the monitor 5. The springs 25, 26, 27 and 28 are tightly sleeved on the longitudinal raised lines 212, 222, 232, and 242 of the axles 21, 22, 23 and 24 so as to provide support to the axles and increase the rotational friction. The springs 25, 26 27 and 28 are connected at the outer end with the two side covers 41 and 42. The cover 41 has recesses 411 and 412 which respectively receive the springs 25 and 26, while the other cover 42 is formed with recesses 421 and 422 respectively receiving the springs 27 and 28, thereby keeping the ends of the springs 25, 26, 27 and 28 in position. The other ends of the axles 21, 22, 23 and 24 are kept in position by the two positioning plates 31 and 32. Hence, the monitor 5 will be able to rotate with respect to the horizontal axle 2 when pushed thus eliminating the vision angle limit of 45 degrees.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A swivel mechanism for a monitor of a laptop computer comprising:

a fixed seat having a vertical axle at the bottom thereof a spring and a positioning block, said positioning block being disposed on a fixed frame rigidly mounted within a main body of the laptop computer and having a vertical hole for receiving the spring, vertical axle tightly fitted within said spring thereby enabling said fixed seat to rotate with respect to the fixed frame in said positioning block; and a horizontal axle having four longitudinal axles extending in the same direction, four springs, two positioning plates, two side covers and a protective cover, each longitudinal axle being formed with a fixed block wherein a first one extends through its respective fixed block thereof to connect to a threaded hole of said fixed seat and kept in position by a screw, a second one passes through its respective fixed block thereof to connect to another threaded hole of said fixed block, and the remaining two are disposed beside an inner side of the monitor, said springs of the horizontal axle being connected at their outer ends with the side covers; whereby the monitor may be rotated with respect to a vertical axis and a horizontal axis when pushed by a user thereby widening vision range.

2. The swivel mechanism as claimed in claim 1, wherein said vertical axle and said longitudinal axles are formed with longitudinal raised lines in order to increase rotational friction when rotating on said springs.

* * * * *